(12) United States Patent
Kestner et al.

(10) Patent No.: US 10,336,013 B2
(45) Date of Patent: *Jul. 2, 2019

(54) LARGE SCALE SMART SUSCEPTOR HEATER BLANKETS REQUIRING MULTI ZONE CONTROL

(71) Applicant: The Boeing Company, Chicago, IL (US)

(72) Inventors: James M. Kestner, Seattle, WA (US); Marc R. Matsen, Seattle, WA (US); Scott D. Billings, Des Moines, WA (US); John A. Mittleider, Kent, WA (US); Robert J. Miller, Fall City, WA (US)

(73) Assignee: THE BOEING COMPANY, Chicago, IL (US)

( * ) Notice: Subject to any disclaimer, the term of this patent is extended or adjusted under 35 U.S.C. 154(b) by 379 days.

This patent is subject to a terminal disclaimer.

(21) Appl. No.: 15/056,297

(22) Filed: Feb. 29, 2016

(65) Prior Publication Data

US 2017/0246815 A1    Aug. 31, 2017

(51) Int. Cl.
| | |
|---|---|
| *B32B 41/00* | (2006.01) |
| *B29C 70/34* | (2006.01) |
| *H05B 3/34* | (2006.01) |
| *B29K 105/08* | (2006.01) |
| *B29L 31/30* | (2006.01) |

(52) U.S. Cl.
CPC ............. *B29C 70/342* (2013.01); *H05B 3/34* (2013.01); *B29K 2105/089* (2013.01); *B29L 2031/3076* (2013.01); *H05B 2203/003* (2013.01); *H05B 2203/007* (2013.01)

(58) Field of Classification Search
CPC .. B29C 70/342; H05B 3/34; H05B 2203/003; H05B 2203/007; B29L 2031/3076; B29K 2105/089
USPC .......................... 156/64, 350, 351, 378, 379
See application file for complete search history.

(56) References Cited

U.S. PATENT DOCUMENTS

| | | | |
|---|---|---|---|
| 6,229,126 | B1 | 5/2001 | Ulrich et al. |
| 8,330,086 | B2 | 12/2012 | Miller et al. |
| 8,884,201 | B2 | 11/2014 | Matsen et al. |

(Continued)

FOREIGN PATENT DOCUMENTS

| | | |
|---|---|---|
| EP | 2471649 A1 | 7/2012 |
| EP | 2511080 A1 | 10/2012 |
| GB | 940407 A | 10/1963 |

OTHER PUBLICATIONS

Kestner et al., "Susceptor Wire Array", U.S. Appl. No. 14/640,227, filed Mar. 6, 2015.

(Continued)

*Primary Examiner* — Michael N Orlando
*Assistant Examiner* — Joshel Rivera
(74) *Attorney, Agent, or Firm* — MH2 Technology Law Group LLP

(57) ABSTRACT

A processing apparatus such as a heating and/or debulking apparatus that may be used to debulk a plurality of uncured composite layers to form an article such as an aircraft component may include a plurality of interconnected smart susceptor heater blankets. The plurality of smart susceptor heater blankets may be connected in series or in parallel, and may be controlled to uniformly heat the component during formation.

20 Claims, 10 Drawing Sheets

(56) References Cited

U.S. PATENT DOCUMENTS

| | | |
|---|---|---|
| 9,174,398 B2 | 11/2015 | Dude et al. |
| 9,914,269 B2 * | 3/2018 | Hopkins .............. B29C 70/342 |
| 2008/0251642 A1 * | 10/2008 | Boschet ................ B64D 15/12 |
| | | 244/134 D |
| 2012/0145702 A1 | 6/2012 | Miller et al. |
| 2012/0145703 A1 | 6/2012 | Matsen et al. |
| 2013/0082047 A1 | 4/2013 | Matsen et al. |
| 2015/0048080 A1 | 2/2015 | Matsen et al. |

OTHER PUBLICATIONS

Miller et al., "Parallel Wire Conductor for Use With a Heating Blanket", U.S. Appl. No. 14/640,217, filed Mar. 6, 2015.

Hopkins et al., "Integrated Smart Susceptor Heater Blanket and Vacuum Bag Deployment System for Large Composite Skin Laminate Debulk", U.S. Appl. No. 15/056,509, filed Feb. 29, 2016.

Hopkins et al., "Integrated Smart Susceptor Heater Blanket Debulk System for Composites", U.S. Appl. No. 15/056,783, filed Feb. 29, 2016.

Extended European Search Report dated Jul. 17, 2017, in EP Application No. 17157275.3, 6 pages.

Extended European Search Report dated Jul. 19, 2017, in EP Application No. 17157477.5, 8 pages.

* cited by examiner

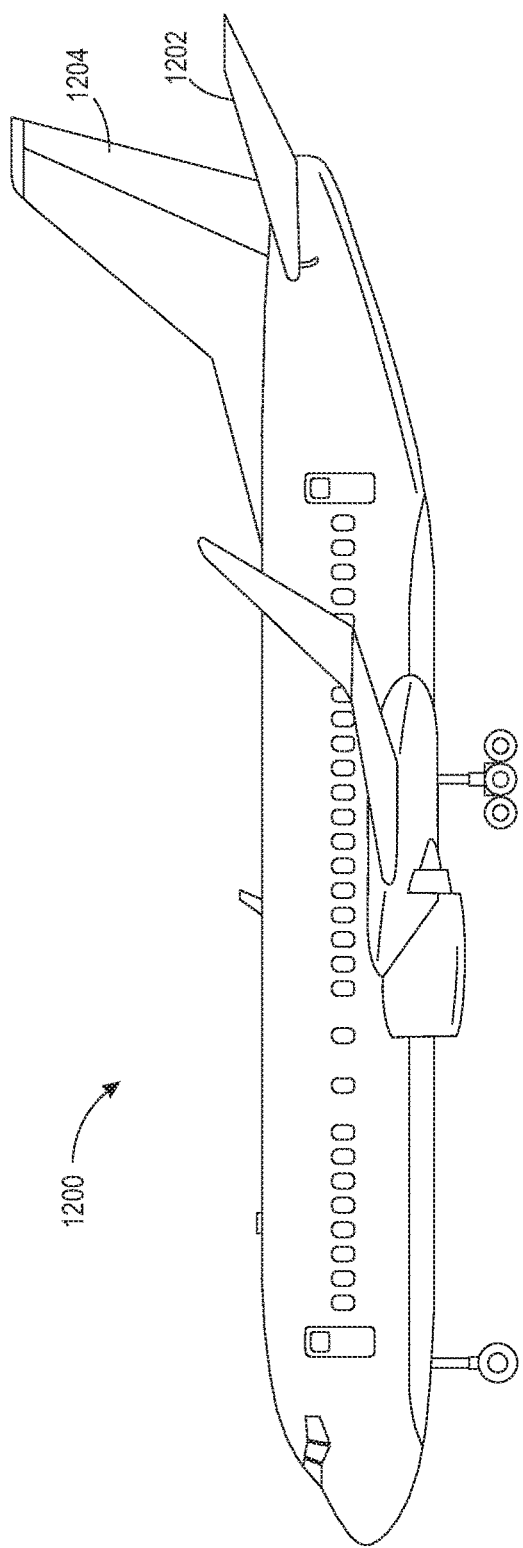

LARGE SCALE SMART SUSCEPTOR HEATER BLANKETS REQUIRING MULTI ZONE CONTROL

TECHNICAL FIELD

The present teachings relate to the manufacture of laminated composite materials that include a debulk of an uncured composite laminate to form, for example, a component for an aircraft, aerospace vehicle, or other vehicle.

BACKGROUND

Manufacturing components for vehicles such as aircraft and aerospace vehicles, ground vehicles, etc., from fiber sheets is well known. A composite part including a plurality of composite plies or sheets that are pre-impregnated with an uncured resin (i.e., prepregs) may be assembled during a layup process. During layup, several (i.e., 20, 40, or more) uncured composite plies are stacked, and then air that may be trapped between each of the several plies may be removed using a vacuum during a "debulk" process. Subsequently, the resin may be cured in an oven or an autoclave. During the curing of the resin, the component is supported on a cure tool that maintains the shape of the component while heat is applied to the component to cure the resin.

The debulking and curing of the plurality of composite plies may be performed in an autoclave. Additionally, techniques have been developed for debulking composite parts without the need for an oven or autoclave. For example, a plurality of uncured composite plies may be placed into a vacuum bag and heated to a temperature below the cure temperature. A vacuum is applied to the vacuum bag to remove air from between each adjacent ply. The debulked composite part may then be removed from the vacuum bag and processed such that it is ready to be heated to a cure temperature within an autoclave.

Debulking of components through the application of heat within a vacuum bag is convenient and cost effective for smaller parts. A relatively small heater blanket may be manufactured at reasonable cost and used to debulk smaller components. However, this approach may not be suitable for some components such as aircraft components (e.g., horizontal stabilizers) which may be manufactured as a large single seamless structure.

Accordingly, there is a need for a method and apparatus for OOA debulking of composite parts out-of-autoclave that employ relatively simple and inexpensive cure tooling. There is also a need for a method and apparatus of the type mentioned above that is well suited for processing relatively large scale parts out-of-autoclave using induction heating and smart susceptors to provide precise and uniform temperature control during the debulk process.

SUMMARY

The following presents a simplified summary in order to provide a basic understanding of some aspects of one or more embodiments of the present teachings. This summary is not an extensive overview, nor is it intended to identify key or critical elements of the present teachings, nor to delineate the scope of the disclosure. Rather, its primary purpose is merely to present one or more concepts in simplified form as a prelude to the detailed description presented later.

In an embodiment, an apparatus for processing an article through the application of heat can include a first smart susceptor heater blanket including a first wire ribbon, wherein the first wire ribbon includes a plurality of first wire assemblies, and each first wire assembly is adjacent to at least one other first wire assembly, each first wire assembly has a litz wire and a susceptor wire wrapped around the litz wire to form a plurality of susceptor windings. Further, the first wire ribbon serpentines across the first smart susceptor heater blanket, and the first wire ribbon is configured such that a current flow through each first wire assembly is in a direction opposite to a current flow through one or more adjacent first wire assemblies. The apparatus may further include a second smart susceptor heater blanket having a second wire ribbon, wherein the second wire ribbon includes a plurality of second wire assemblies, each second wire assembly is adjacent to at least one other second wire assembly, and each second wire assembly includes a litz wire and a susceptor wire wrapped around the litz wire to form a plurality of susceptor windings. Further, the second wire ribbon serpentines across the second smart susceptor heater blanket, and the second wire ribbon is configured such that a current flow through each second wire assembly is in a direction opposite to a current flow through one or more adjacent second wire assemblies. Additionally, one of the first wire assemblies of the first wire ribbon is positioned adjacent to one of the second wire assemblies in the second wire ribbon and is configured such that a flow of current therethrough is in direction that is opposite to a flow of current through the second wire assembly positioned adjacent thereto.

The first smart susceptor heater blanket may be electrically coupled in series or in parallel to the second smart susceptor heater blanket.

The apparatus may further include a first power supply electrically coupled to the first wire ribbon of the first smart susceptor heater blanket, and a second power supply electrically coupled to the second wire ribbon of the second smart susceptor heater blanket. The apparatus may further include a controller electrically coupled to the first power supply and to the second power supply. The controller may be configured to regulate a power output by the first power supply to the first wire ribbon, and may be further configured to regulate a power output by the second power supply to the second wire ribbon.

In an embodiment, the apparatus further includes a first plurality of thermal sensors distributed across the first smart susceptor heater blanket. The controller may be configured to regulate the power output by the first power supply to the first wire ribbon based on an output received from the first plurality of thermal sensors. The apparatus may further include a second plurality of thermal sensors distributed across the second smart susceptor heater blanket, and the controller may be further configured to regulate the power output by the second power supply to the second wire ribbon based on an output received from the second plurality of thermal sensors.

The apparatus may further include a first slave controller electrically coupled to the first smart susceptor heater blanket, a first plurality of thermal sensors distributed across the first smart susceptor heater blanket, and a first power supply electrically coupled to the first slave controller and to the first smart susceptor heater blanket, wherein the first slave controller is configured to regulate a power output by the first power supply to the first smart susceptor heater blanket based on an output received from the first plurality of thermal sensors. Additionally, the apparatus may include a second slave controller electrically coupled to the second smart susceptor heater blanket, a second plurality of thermal sensors distributed across the second smart susceptor heater blanket, and a second power supply electrically coupled to the second slave controller and to the second smart susceptor heater blanket, wherein the second slave controller is configured to regulate a power output by the second power supply to the second smart susceptor heater blanket based on an output received from the second plurality of thermal sensors. A master controller may be electrically coupled to the first slave controller and to the second slave controller, wherein the master controller is configured to receive the output from the first plurality of thermal sensors and the output from the second plurality of thermal sensors. The master controller may be further configured to regulate the power output by the first power supply to the first smart susceptor heater blanket based on the output received from the second plurality of thermal sensors, and to regulate the power output by the second power supply to the second smart susceptor heater blanket based on the output received from the first plurality of thermal sensors.

In an embodiment, the first wire ribbon and the second wire ribbon each have lengths that are within ±10% of a target length.

The apparatus may further include a vacuum bag positioned adjacent to the first smart susceptor heater blanket and the second smart susceptor heater blanket, wherein the vacuum bag is configured to receive a plurality of composite plies pre impregnated with an uncured resin during a debulking process. A plurality of fasteners may be used to mechanically attach the first smart susceptor heater blanket and the second smart susceptor heater blanket to the vacuum bag, and to maintain the first smart susceptor heater blanket in a fixed position adjacent to the second smart susceptor heater blanket.

In another embodiment, a method for processing an article through the application of heat can include positioning a first smart susceptor heater blanket having a first wire ribbon adjacent to a second smart susceptor heater blanket having a second wire ribbon, placing a plurality of uncured composite plies in proximity to the first smart susceptor heater blanket and the second smart susceptor heater blanket, and applying a current to a plurality of first wire assemblies of the first wire ribbon, wherein each first wire assembly is adjacent to at least one other first wire assembly, such that a current flow through each first wire assembly is in a direction that is opposite to a current flow through any adjacent first wire assembly. The method may further include applying a current to a plurality of second wire assemblies of the second wire ribbon such that a current flow through each second wire assembly is in a direction that is opposite to a current flow through any adjacent second wire assembly. Further, each second wire assembly may be adjacent to at least one other second wire assembly, and the positioning may further include placing the first smart susceptor heater blanket adjacent to one of the second wire assemblies such that the current flow through the first wire assembly adjacent to the second wire assembly is in an direction that is opposite to the current flow through the adjacent second wire assembly.

The applying of the current to the plurality of first wire assemblies and the applying of the current to the plurality of second wire assemblies may applies the current in series or in parallel between the first smart susceptor heater blanket and the second smart susceptor heater blanket.

The method may further include applying the current flow to the plurality of first wire assemblies using a first power supply, and applying the current flow to the plurality of second wire assemblies using a second power supply.

The current flow to the first smart susceptor heater blanket and the second smart susceptor heater blanket may be regulated using a controller. The method may further include monitoring a plurality of temperatures at a plurality of locations of the first smart susceptor heater blanket using a first plurality of thermal sensors distributed across the first smart susceptor heater blanket, regulating the current flow output by the first power supply to the first smart susceptor heater blanket based on an output received from the first plurality of thermal sensors using the controller, monitoring a plurality of temperatures at a plurality of locations of the second smart susceptor heater blanket using a second plurality of thermal sensors distributed across the second smart susceptor heater blanket, and regulating the current flow output by the second power supply to the second smart susceptor heater blanket based on an output received from the second plurality of thermal sensors using the controller.

In an embodiment, the method further includes transmitting an output from a first plurality of thermal sensors distributed across the first smart susceptor heater blanket to a controller, transmitting an output from a second plurality of thermal sensors distributed across the second smart susceptor heater blanket to the controller, regulating the current flow to the second smart susceptor heater blanket based on the output from the first plurality of thermal sensors using the controller, and regulating the current flow to the first smart susceptor heater blanket based on the output from the second plurality of thermal sensors using the controller.

If used, the controller may be a master controller, where the method further includes controlling a first slave controller using the master controller to perform the regulating of the current flow to the first smart susceptor heater blanket and controlling a second slave controller using the master controller to perform the regulating of the current flow to the second smart susceptor heater blanket.

In an embodiment, the method may further include placing a plurality of composite plies into a vacuum bag, wherein the plurality of composite plies are pre-impregnated with an uncured resin, and placing the vacuum bag and the plurality of composite plies in proximity to the first smart susceptor heater blanket and the second smart susceptor heater blanket. Additionally, the plurality of composite plies may be heated using the first smart susceptor heater blanket and the second smart susceptor heater blanket. A vacuum may be applied to the vacuum bag and to the plurality of composite plies during the heating to debulk the plurality of composite plies.

BRIEF DESCRIPTION OF THE DRAWINGS

The accompanying drawings, which are incorporated in, and constitute a part of this specification, illustrate embodiments of the present teachings and, together with the description, serve to explain the principles of the disclosure. In the figures:

FIG. 12 is a side view of an aircraft including one or more composite parts formed using an embodiment of the present teachings.

Figure 1:
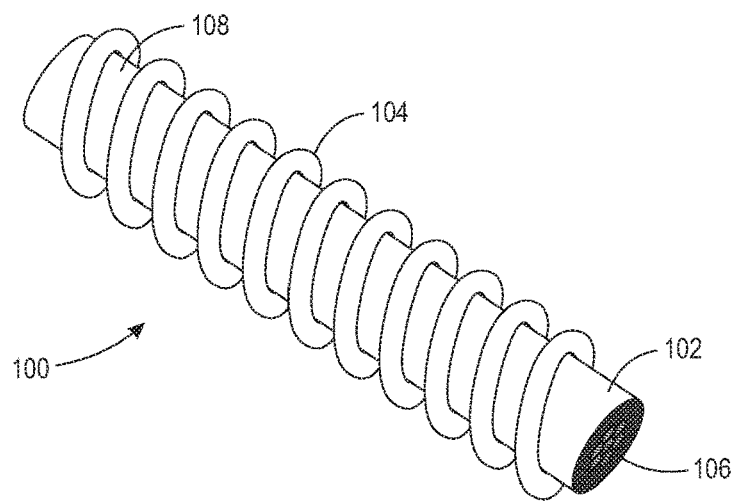
FIG. 1 is a perspective depiction of a wire assembly including a litz wire and a susceptor wire in accordance with an embodiment of the present teachings.

It should be noted that some details of the FIGS. have been simplified and are drawn to facilitate understanding of the present teachings rather than to maintain strict structural accuracy, detail, and scale.

DETAILED DESCRIPTION

Reference will now be made in detail to exemplary embodiments of the present teachings, examples of which are illustrated in the accompanying drawings. Wherever possible, the same reference numbers will be used throughout the drawings to refer to the same or like parts.

A smart susceptor heater blanket (hereinafter, "heater blanket") for out-of-autoclave (OOA) curing of a composite patch is described, for example, in U.S. Pat. No. 9,174,398 which is commonly assigned herewith and incorporated herein by reference in its entirety. The heater blanket of the incorporated patent may be used to cure a patch over a relatively small rework area.

An embodiment of the present teachings may provide a method and apparatus for processing large components OOA, for example, debulking of an uncured composite part. The method and apparatus may allow OOA debulking of a large-scale composite part, for example, a plurality of uncured composite plies having a size (e.g., a perimeter, footprint, or outside dimension) that previously required debulking or other processing within an autoclave due to size or other contributing factors. With prior processing, increasing the blanket size to accommodate large-scale composite parts presents several challenges. For example, a large heater blankets require long internal wiring with a high electrical resistance, and therefore require a high current power source to sufficiently power the blanket, which is expensive. Further, very large smart susceptor heater blankets are expensive to manufacture, and the cost of scrapping an unrepairable smart susceptor heater blanket is also expensive. Therefore, large components have most often been both debulked and cured within an autoclave. However, autoclave processing is also expensive as a large volume of process gas such as nitrogen must be heated, cooled, and reheated during debulking of a large-scale composite part within an autoclave. There is also substantial capital cost and manufacturing flow time associated with the use of an autoclave.

An embodiment of the present teachings may include processing apparatus including a plurality of interconnected heater blankets. While the present teachings are generally described with reference to a debulking process for simplicity, it will be understood that other processing, such as curing, is also contemplated.

The debulking apparatus may include a particular electrical design that requires a relatively low current power source and has a low electrical interference between adjacent heater blankets. In an embodiment, the debulking apparatus may include at least two (i.e., two or more) heater blankets, for example, 8, 12, 16, 20, or more interconnected heater blankets, with the number of interconnected heater blankets depending, for example, on the size of the heater blankets and the size of the composite part that is being debulked. A modular heater blanket design in accordance with an embodiment of the present teachings may facilitate simplified replacement and powering of apparatus components at a reduced cost compared to single heater blanket designs.

It will be appreciated that actual assemblies represented by the FIGS. may include other structures that have not been depicted for simplicity, and that depicted structures may be removed or modified.

FIG. 1 is a perspective depiction of a portion of a heater blanket wire assembly 100 that includes a litz wire 102 and a susceptor wire 104 that may wrap around the litz wire 102 in a helix or spiral to form a plurality of susceptor windings around the litz wire. As known in the art, the litz wire 102 includes a plurality of electrically conductive wires 106 electrically insulated from each other, and an electrical insulator 108 interposed between the susceptor wire 104 and the plurality of conductive wires 106. In an embodiment, the wire assembly 100 may have a diameter of from about 0.04" to about 0.08", or about 0.06", as measured on an outside surface of the susceptor wire 104, although other dimensions are contemplated. The wire assembly 100 includes a first end and a second end opposite the first end, wherein the wire assembly 100 extends from the first end to the second end. The length of the wire assembly 100 will depend on the size of the heater blanket that it forms a part of but, in an embodiment, the wire assembly 100 may be from about 5 feet to about 100 feet long.

Figure 2:
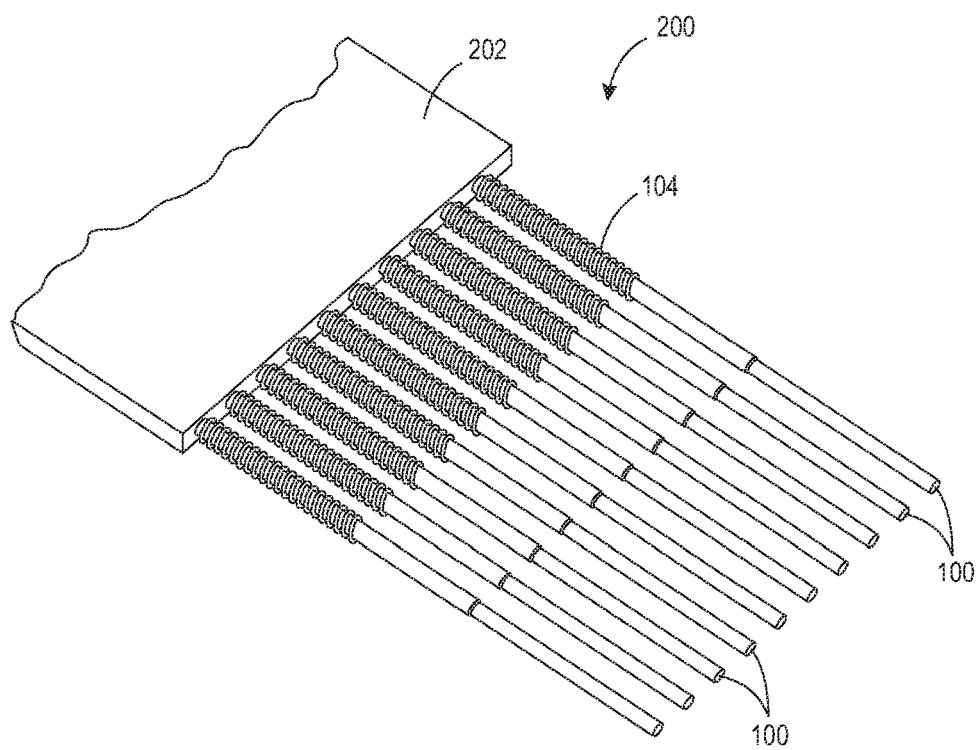
FIG. 2 is a perspective depiction of a wire ribbon including a plurality of wire assemblies in accordance with an embodiment of the present teachings.

FIG. 2 is a cutaway perspective depiction of a portion of a wire ribbon 200 that includes a plurality of individual spaced wire assemblies 100. The plurality of wire assemblies 100 may be encapsulated or otherwise encased together within an electrically insulative and thermally conductive binder 202 such as a silicone binder. In an embodiment, the binder 202 may have a thickness of from about 0.025" to about 0.25", or another thickness that is suitable for transfer of thermal energy generated within the susceptor wires by the flow of current through the litz wires to an adjacent workpiece. The wire ribbon 200 may include any number of wire assemblies 100, for example, at least two, or up to 10 or more wire assemblies 100. The wire ribbon 200 may have a width of from about 0.5" to about 12", or from about 0.5" to about 12", or from about 2" to about 12", or from about 0.5" to about 6.0", or another suitable width depending, for example, on size constraints, electrical constraints, the number of wire assemblies 100 within the wire ribbon 200, etc.

Figure 3:
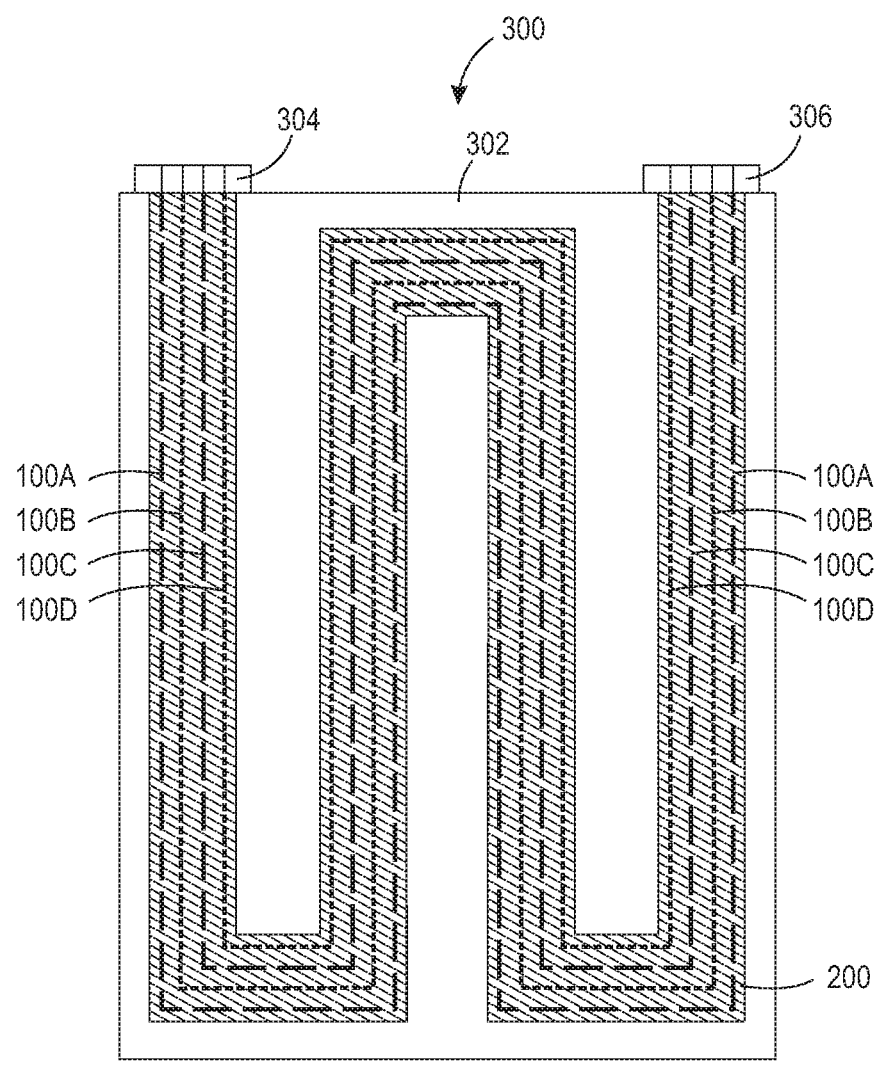
FIG. 3 is a plan view of a smart susceptor heater blanket in accordance with an embodiment of the present teachings.

FIG. 3 is a plan view depicting a heater blanket 300 including the wire ribbon 200 of FIG. 2. For illustration, the wire ribbon 200 of FIG. 3 includes four wire assemblies 100A-100D. The heater blanket 300 may include a blanket substrate 302. In an embodiment, the blanket substrate 302 may include a layer of silicone binder to which the wire ribbon is attached using an attachment such as an adhesive. In another embodiment, the blanket substrate 302 may include two layers of silicone binder, wherein the wire ribbon 200 is interposed between the two layers. In any case, the wire ribbon is positioned to extend back and forth (i.e., serpentine) across the heater blanket as depicted in FIG. 3. While the wire ribbon 200 in FIG. 3 is depicted with three 180° turns for simplicity given the scale of the figure, it will be appreciated that a wire ribbon 200 may include, for example, between six and twelve 180° turns, or eight or more 180° turns as it serpentines across the heater blanket 300. Further, the wire ribbon 200 may be formed as a straight ribbon and folded in a desired pattern to form the heater blanket 300, and may extend across the heater blanket 300 in other patterns. In general, the wire ribbon 200 may cover a suitable percentage of the heater blanket surface area, perimeter, or footprint to maintain even heating of the article being debulked during the debulking process.

The heater blanket 300 further includes a first electrical connector 304 attached to the first end of each wire assembly 100 and a second electrical connector 306 attached to the second end of each wire assembly. In an embodiment, the first electrical connector 304 may be a male type connector and the second electrical connector may be a female type connector. The pair of connectors 304, 306 allows a power source to be electrically coupled to each of the wire assemblies 100A-100D using either a series connection or a parallel connection as described below. Two or more heater blankets 300 may be manufactured.

Figure 4:
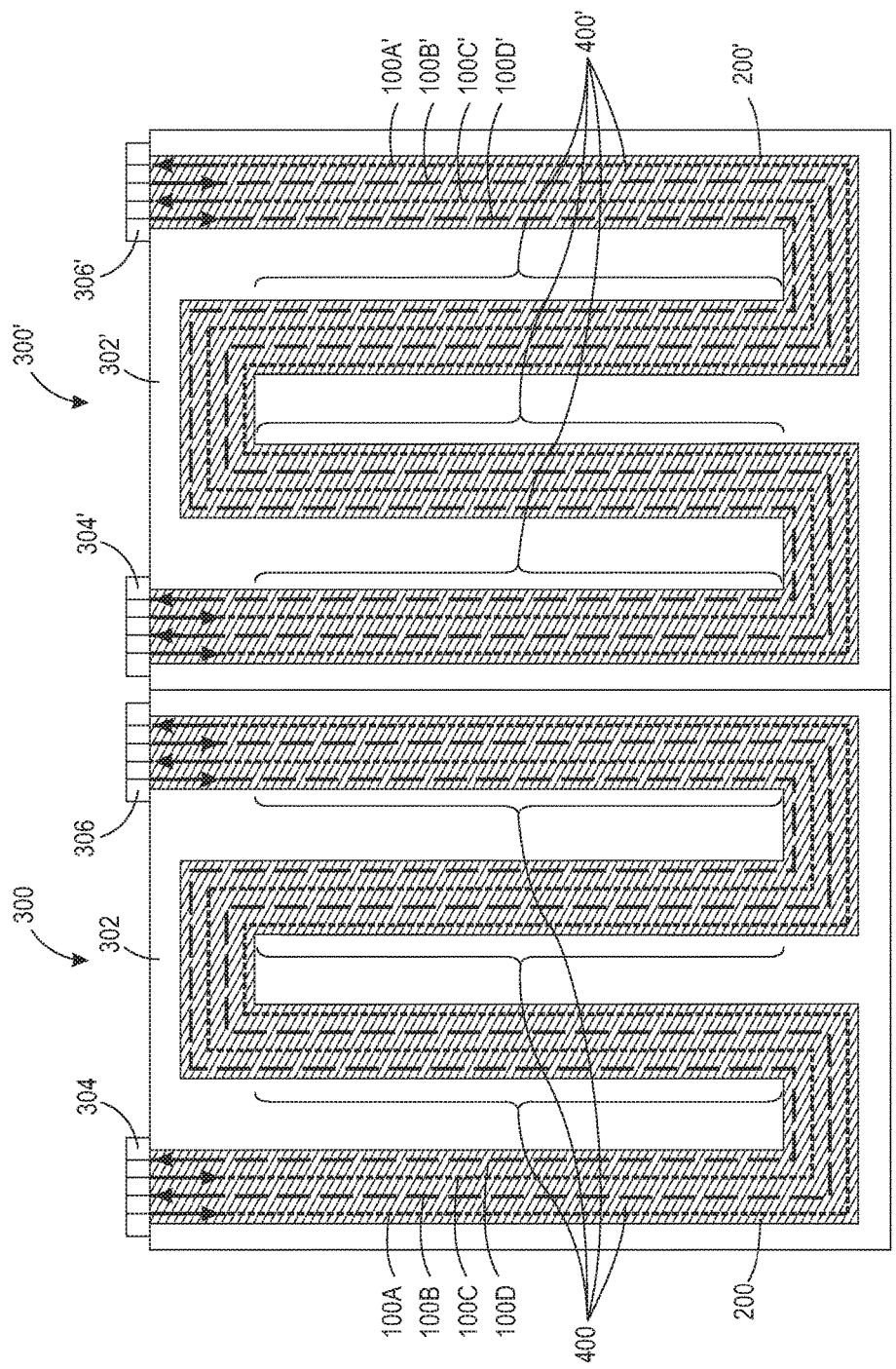
FIG. 4 is a plan view depicting two or more adjacent smart susceptor heater blankets in accordance with an embodiment of the present teachings.

Two or more heater blankets 300 of FIG. 3 may be assembled to form a component of the debulking apparatus as depicted in FIG. 4, which depicts a first heater blanket 300 and a second heater blanket 300 prime (300'), which may be identical or may vary in shape. However, in general, the length of the wire ribbon 200 within each heater blanket may be similar such that both or all heater blankets are matched with respect to power requirements. In an embodiment, the wire ribbon 200 within each heater blanket 300 may be manufactured such that the length of all wire ribbons varies by no more than about ±10% from a target length. In other words, the shortest wire ribbon may have a length no more than 0.9 times the target length of all wire ribbons for the debulking apparatus, and the longest wire ribbon may have a length no more than 1.1 times the target length. This ensures that all heater blankets within the debulking apparatus operate with similar heating and cooling characteristics so that a uniform and predictable temperature may be maintained across the article being debulked. In other embodiments, the wire ribbon 200 within each heater blanket 300 may be manufactured such that the length of all wire ribbons varies by no more than ±20%, or by no more than ±15%. In other embodiments, the variation in length may not a design consideration.

Figure 5:
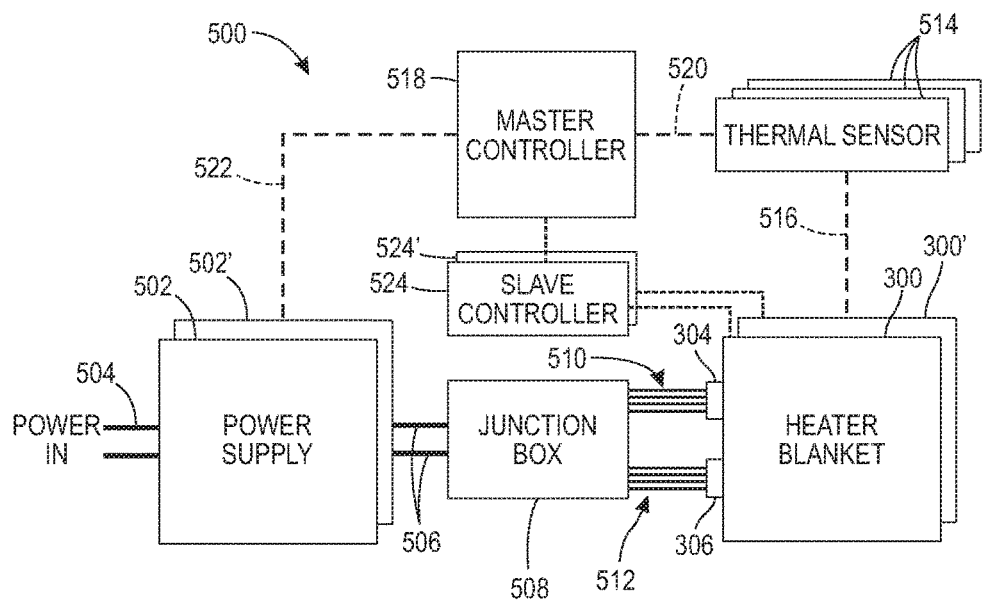
FIG. 5 is a schematic depiction of a processing assembly such as a debulking apparatus in accordance with an embodiment of the present teachings.

FIG. 5 is a block diagram of a heater blanket apparatus 500 that may be part of a debulking apparatus. While the FIG. 5 depiction includes two heater blankets 300, 300' for debulking an uncured composite part in accordance with an embodiment of the present teachings, it will be understood that a heater blanket apparatus 500 may include any number of heater blankets. FIG. 5 depicts one or more power supplies 502, 502' including an input 504 and an output 506. As described below, one power supply 502 may power all heater blankets 300, 300', or separate power supplies 502, 502' may power each heater blanket 300, 300'. FIG. 5 further depicts a junction box 508 having an input (e.g., the output 506 of the power supply 502). The junction box provides a first input/output 510 to each of the first connectors 304, and a second input/output to each of the second connectors 306. The input/outputs 510, 512 from the junction box 508 will depend on the particular design or configuration of the heater blanket apparatus 500 as described below. The heater blankets 300, 300' are electrically coupled with, and receive power through, input/outputs 510, 512 of the junction box 508 through the electrical connectors 304, 306 as depicted.

FIG. 5 further depicts a plurality of thermal sensors 514 such as thermocouples. The thermal sensors 514 are in thermal communication 516 with one or more of the heater blankets 300, 300'. In an embodiment, a plurality of the thermal sensors are in thermal proximity to each of the heater blankets 300, 300' to monitor a temperature of the heater blankets 300, 300', and assist in maintaining a uniform heater blanket temperature range during debulking. The thermal sensors 514 may transfer temperature data to a controller 518, for example, through a wired or wireless connection or interface 520. The controller 518 is in electrical communication with, and controls, the power supply through, for example, a communication cable 522.

The master controller 518 may be electrically coupled with, and control, a plurality of slave controllers 524, 524'. Each slave controller 524, 524' is electrically coupled with one of the heater blankets 300, 300' respectively. Each slave controller 524, 524' monitors and controls one of the heater blankets 300, 300'. Further, each slave controller 524, 524' may receive data and instructions from the master controller 518, and may pass operational data relative to the heater blankets 300, 300' to the master controller 518. The master controller 518 may control the output 506 from the power supplies 502, 502' based on the heater blanket operational data.

During use, each litz wire 102 of each wire ribbon 200 is electrically coupled with the power supply 502. Current from the power supply 502 flowing through the litz wire 102 generates a magnetic field within each susceptor wire 104 of each wire ribbon 200 of each heater blanket 300. The magnetic field, in turn, generates heat within the wire ribbon 200 which thereby heats each heater blanket 300. The susceptor wire includes a Curie temperature ($T_c$), where the Curie temperature results, at least in part, from the particular composition of the susceptor wire. Inductive heating of the susceptor wire may be reduced when the susceptor sleeve becomes non-magnetic upon reaching the Curie temperature. The reduction in the heating of the susceptor sleeve may result in reducing the conductive heating of the structure. At a low temperature, a magnetic permeability of the susceptor wire 104 is high, and thus a skin depth of the susceptor wire 104 is small and the magnetic field induces strong eddy currents having a relatively high thermal output that heats the heater blanket 300. As the temperature of the susceptor wire 104 increases, the magnetic permeability of the susceptor wire 104 decreases to a lower value and the skin depth of the susceptor wire 104 increases. At high temperatures, the skin depth is larger than the radius of the susceptor wire 104, and the eddy currents within the susceptor wire 104 interfere with each other thereby weakening the eddy currents. The weaker eddy currents have a relatively low thermal output and thus the heater blanket 300 generates less heat. Each portion of the susceptor wire 104 thereby becomes its own temperature regulator to maintain a uniform temperature without altering the current applied to the litz wire 102. The temperature self-regulation occurs locally and continuously along the length of each wire ribbon 200, such that the desired temperature within a temperature range is maintained at all locations along the length of the wire ribbon 200 and, therefore, across the area of the heater blanket 300. Unless otherwise noted, as used herein, the terms "smart susceptor heater blanket," "susceptor heater blanket," and "heater blanket" refer to a heater blanket that is capable of temperature self-regulation.

As depicted in FIG. 4, at least two heater blankets 300, 300' are placed adjacent to each other during a debulking operation, for example, to increase the area that may be simultaneously debulked. The two or more heater blankets 300, 300' may be electrically coupled together, either in series or in parallel, and to the power supply 502 as described below.

The arrows positioned near each connector 304, 306 on each wire assembly 100 of FIG. 4 represent a direction of AC current flow at a given point in time that provides a current polarity for each wire assembly 100 and, more particularly, through each litz wire 102 of each wire assembly 100. The current is applied to each litz wire 102 such that the current flows in a direction that is opposite to the direction of current flow through every adjacent litz wire 102. In other words, during use, the current in each wire segment is 180° out of phase with each adjacent wire segment. As depicted in FIG. 4, current flows away from the first connector 304 and toward the second connector 306 for wire assemblies 100A and 100C, and current flows toward the first connector 304 and away from the second connector 306 for wire assemblies 100B and 100D. In other words, current flows in a first direction for wire assemblies 100A and 100C (generally depicted as relatively longer dashed lines) and in a second direction for their respective adjacent wire assemblies 100B and 100D (generally depicted as relatively shorter dashed lines), wherein the second direction is opposite to the first direction.

Additionally, as depicted in FIG. 4, for purposes of description, each wire ribbon 200, 200' may include a plurality of parallel major segments or legs 400, 400' that are positioned adjacent to at least one other major segment 400, 400'. As depicted, the rightmost major segment 400 for heater blanket 300 is positioned adjacent to, and is parallel with, the leftmost major segment 400' for heater blanket 300', such that wire assembly 100A is positioned adjacent to wire assembly 100A'. As depicted, the flow of current through wire assembly 100A in the rightmost major segment 400 is opposite to the flow of current through wire assembly 100A' in the leftmost major segment 400'. It will be realized, however, that this occurs particularly when both blankets are connected to the same power supply. In general, two or more power supplies will operate at somewhat different frequencies and so, in this example, current in the rightmost major segment 400 will be in the opposite direction only about half the time. This will lead to at least a small increase in magnetic fields.

Maintaining the flow of current in opposite directions for all adjacent wire assemblies 100A-100D, 100A'-100D' ensures that any magnetic field not absorbed by the susceptor windings is minimized by cancellation of an opposing field generated by the two adjacent major segments 400. This specific design element of the individual smart susceptor heater blankets 300, at least in part, enables the ability to place two or more heater blankets 300 directly adjacent to one another without causing or resulting in electromagnetic or thermal interference which would affect the heating of the heater blanket 300, the debulking apparatus in general, and any item being heated thereby.

Figure 6:
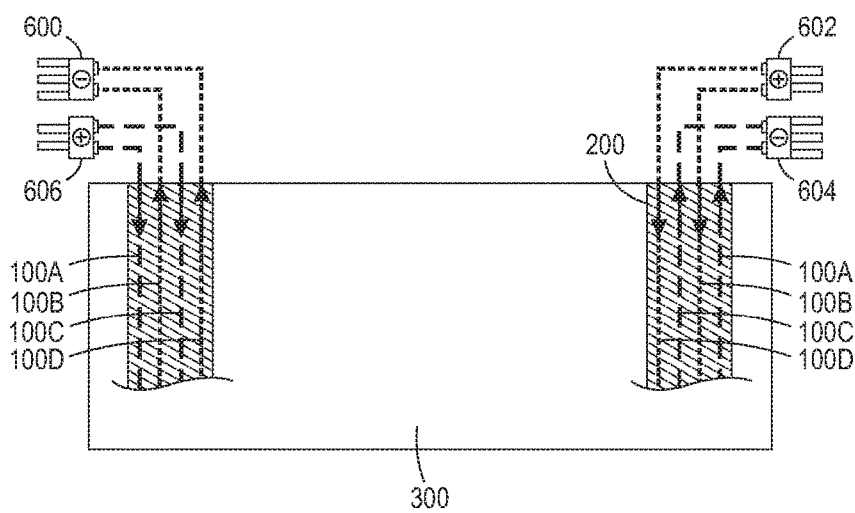
FIG. 6 is a schematic plan view depicting a portion of a smart susceptor heater blanket in accordance with an embodiment of the present teachings.

Various connection configurations for electrically coupling each heater blanket with the power supply and/or the junction box are contemplated. In one embodiment as depicted in FIG. 6, a pair of connector types may be used at each end of the wire ribbon 200. In this embodiment, the litz wires having the same polarity (e.g., the same current flow direction) are grouped into the same connector to enable proper electrical connection to adjacent blankets or electrical coupling to the power supply. In FIG. 6, connector 600 is a female connector having a negative polarity (i.e., current flow toward the connector) that is connected to a first end of wire assemblies 100B and 100D, connector 602 is a male connector having a positive polarity (i.e., current flow away from the connector) that is connected to a second end of wire assemblies 100B and 100D, connector 604 is a female connector having a negative polarity that is connected to a first end of wire assemblies 100A and 100C, and connector 606 is a male connector having a positive polarity that is connected to a second end of wire assemblies 100A and 100C.

Figure 7:
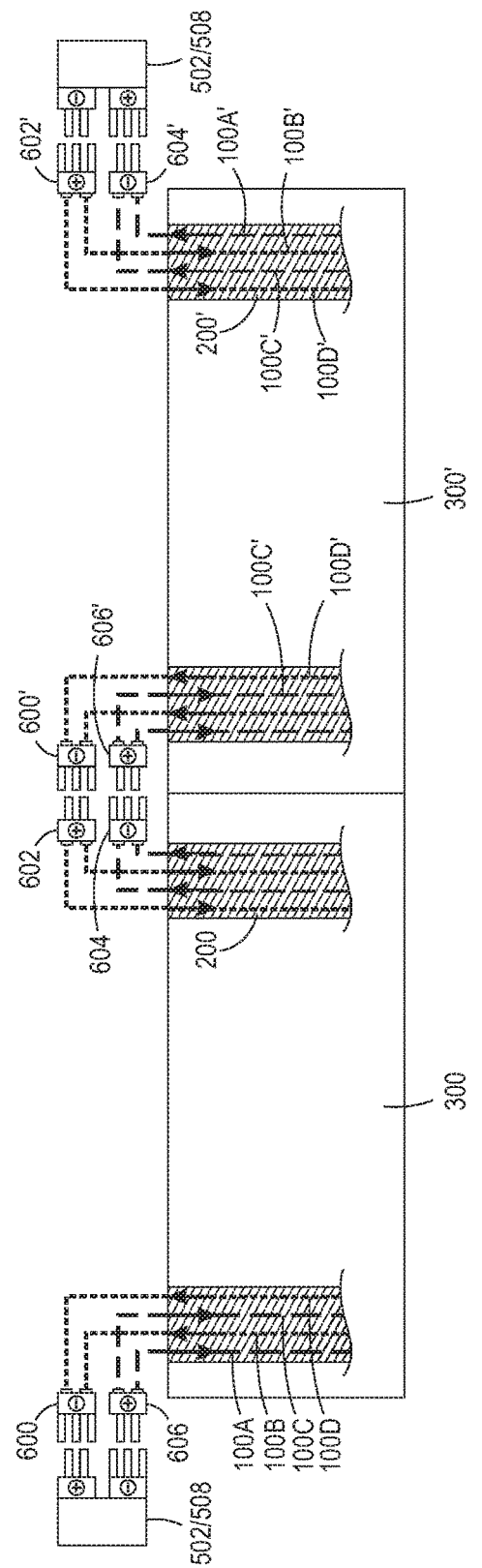
FIG. 7 is a schematic plan view depicting two or more smart susceptor heater blankets to be connected in series in accordance with an embodiment of the present teachings.

FIG. 7 depicts the heater blanket 300 (e.g., a first heater blanket) of FIG. 6 as it may be electrically coupled with a second heater blanket 300' using a series electrical connection (i.e., in series). Connectors 600, 606 of the first heater blanket 300 and connectors 602', 604' of the second heater blanket 300' are electrically connected or coupled with the power supply 502 and/or junction box 508, for example through electrical connectors as depicted. Connectors 602, 604 of the first heater blanket 300 are electrically connected to connectors 600', 606' of the second heater blanket 300' as depicted.

Figure 8:
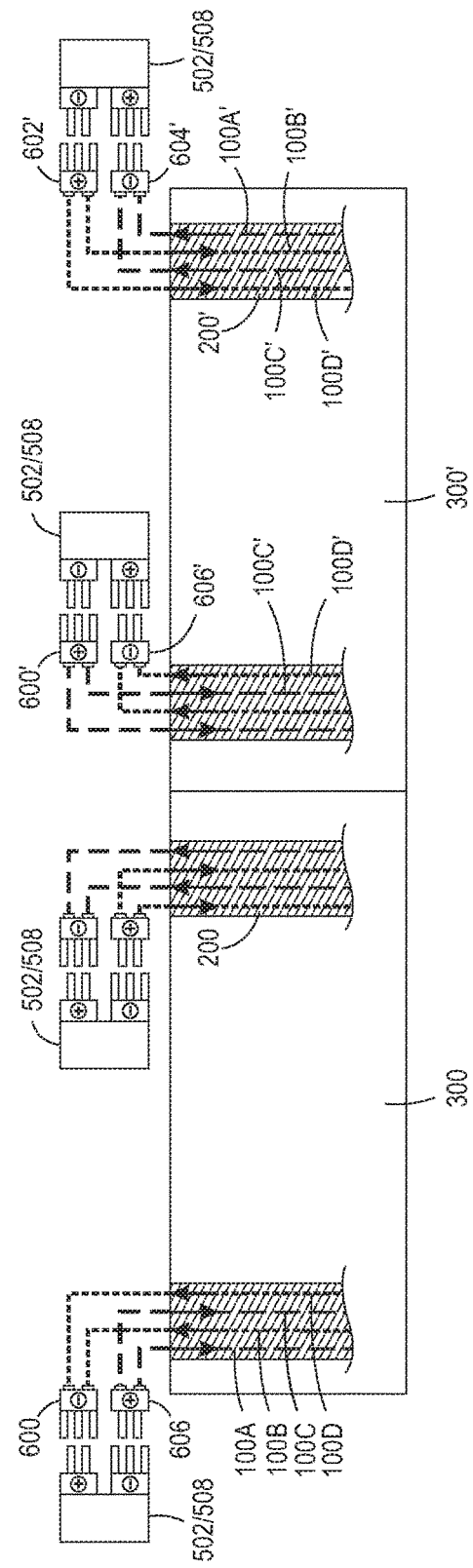
FIG. 8 is a schematic plan view depicting two or more smart susceptor heater blankets to be connected in parallel in accordance with an embodiment of the present teachings.

FIG. 8 depicts the first heater blanket 300 as it may be electrically coupled with the second heater blanket 300' using a parallel electrical connection (i.e., in parallel). Each of the electrical connectors 600-606, 600'-606' are electrically connected or coupled with the power supply 502 and/or junction box 508, for example through electrical connectors as depicted. In an embodiment, each power supply 502 of FIG. 8 is the same power supply 502. In another embodiment, each power supply 502 of FIG. 8 is a different power supply 502, for example, to reduce the current requirements for each power supply.

Figure 9:
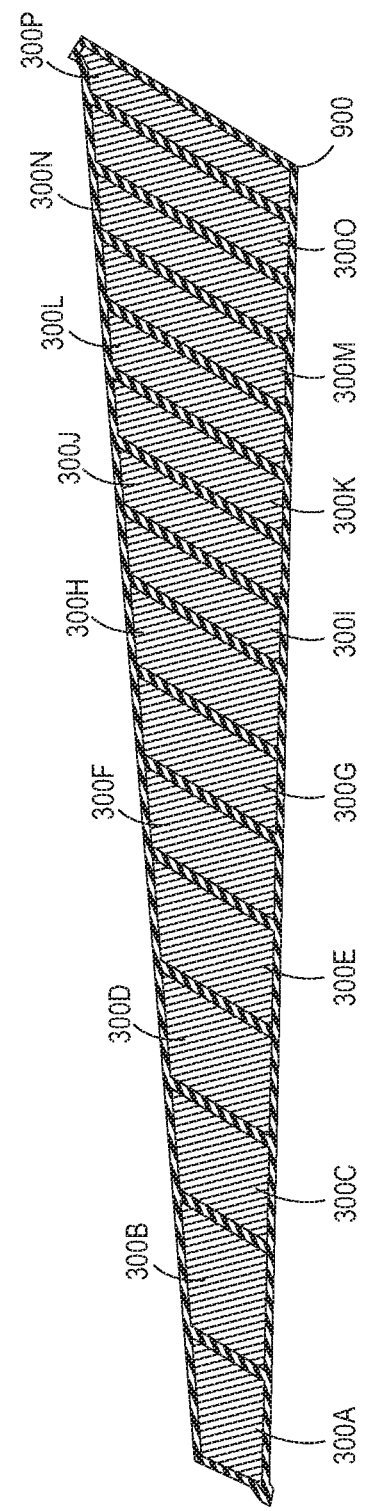
FIG. 9 is a plan view depicting a plurality of smart susceptor heater blankets and an uncured composite part to be debulked in accordance with an embodiment of the present teachings.
Figure 10:
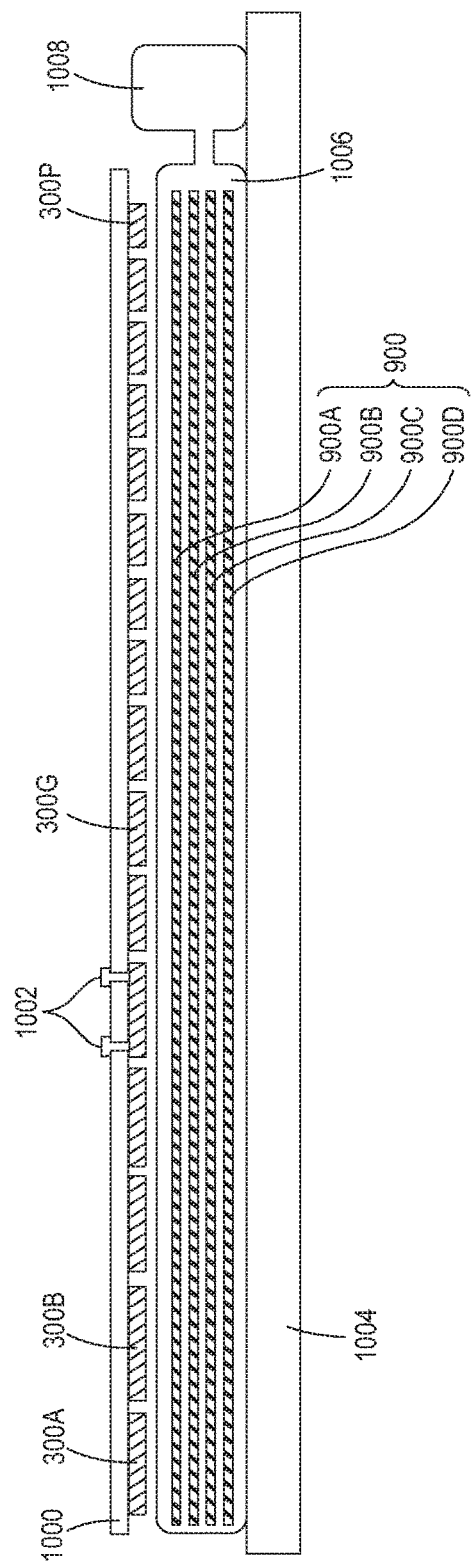
FIG. 10 is a cross section depicting a plurality of smart susceptor heater blankets and an uncured composite part to be debulked in accordance with an embodiment of the present teachings.

FIG. 9 is a plan view, and FIG. 10 is a cross section, of a debulking assembly including a plurality of heater blankets 300A-300P during use, and an uncured composite part or article 900 to be debulked. In this embodiment, 16 heater blankets (e.g., corresponding to 16 heating zones) 300A-300P are placed adjacent to each other and electrically coupled to a power supply, for example, as described above or using another connection design. In an embodiment, each heater blanket 300A-300P may be attached to a different power supply as described above, for example, to reduce current requirements. While FIG. 10 depicts the heater blankets 300A-300P overlying the composite part 900, the composite part 900 may be placed over the heater blankets 300A-300P. It will be realized that heater blankets may also be placed both over and under the composite part 900 during debulking. Further, while the composite part 900 of FIG. 10 depicts four laminate layers 900A-900D such as prepregs, it will be appreciated that the composite part 900 may include any number of laminate layers to be laminated together, for example, 40 or more layers. Further, composite part 900 may include a three dimensional (3D) woven prepreg rather than a laminate.

In FIG. 9, the plurality of heater blankets 300A-300P include individualized shapes that are designed to conform to the shape of the composite part 900 being debulked. Each heater blanket of the plurality of heater blankets 300A-300P may have the same, or different, perimeter lengths and shapes as all other heater blankets 300A-300P. Some heater blankets of the plurality of heater blankets 300A-300P may have the same perimeter lengths and shapes as other heater blankets 300A-300P, while other heater blankets have different perimeter shapes and lengths as other heater blankets 300A-300P. In an embodiment, each heater blanket 300A-300P may have a wire ribbon 200 as described above. In an embodiment including only a single power supply that powers every heater blanket 300A-300P, each wire ribbon for each heater blanket 300A-300P may be designed to have a length that varies no more than ±20%, or no more than ±15%, or no more than ±10% from a common target value, such that the power requirements for each heater blanket 300A-300P are matched and similar to all other heater blankets 300A-300P. The plurality of heater blankets 300A-300P may be mechanically attached to a mounting surface or support 1000 using, for example, a plurality of fasteners 1002 (depicted only on heater blanket 300E in FIG. 10 for simplicity). The fasteners 1002 may maintain the each blanket in a fixed position relative to one or more adjacent blankets. The composite part 900 may rest on a base or working surface 1004, such as a contoured layup mandrel, during debulking. In an embodiment where each heater blanket 300A-300P is powered by a separate power supply, the output of all power supplies may be the same, or the output may be matched for the requirement of the heater blanket that it powers.

In an embodiment, the composite part 900 may be placed into a vacuum bag 1006 that is attached to a vacuum source 1008 during debulking. During a debulking operation, electrical power is applied to each of the heater blankets 300A-300P while a vacuum is applied to the vacuum bag 1006 by the vacuum source 1008. The heater blankets 300A-300P may be designed to reach and maintain a target temperature such that the requirements for debulking the composite part 900 are met, and thus heat the composite part 900 to a desired temperature. The smart susceptor effect provides localized temperature control to account for variations in thermal load.

In an embodiment, each of the 16 heater blankets may be controlled through the use of 16 slave controllers 524 (FIG. 5), wherein each slave controller 524 controls and monitors one of the heater blankets 300A-300P. In an embodiment, the master controller 518 (FIG. 5) may define a ramp of temperature of each heater blanket 300A-300P, either directly or through the slave controllers 524, until each heater blanket 300A-300P reaches a temperature target or set point. The 16 slave controllers power the 16 heater blankets via feedback control loop based on temperature values within each zone measured, for example, using thermal sensors 514. Software within the controller 518 may include a software algorithm that surveys multiple temperatures in each zone. The highest temperature from a plurality of measurement points may be used for control at every point in time. The highest temperature during the temperature ramp may change from location to location within a zone over the duration of the temperature ramp and/or temperature dwell.

Each of the one or more power supplies may include load tuning that may be used to monitor a health of each smart susceptor heater blanket 300A-300P. The master controller 518 and/or slave controllers 524 may monitor the health of each heater blanket 300A-300P, both prior to and during the debulking operation. The controller 518 may further monitor operation of the vacuum source 1008 and the vacuum within the vacuum bag 1006. Process data may be continuously captured and logged within a data file before, during, and after a debulking operation for real-time or subsequent analysis.

It will be appreciated that the plurality of heater blankets 300A-300P may be assembled into an enclosure or interposed between two or more rigid and/or flexible layers such that the plurality of modular heater blankets 300A-300P become subassemblies of a heater blanket assembly.

Figure 11:
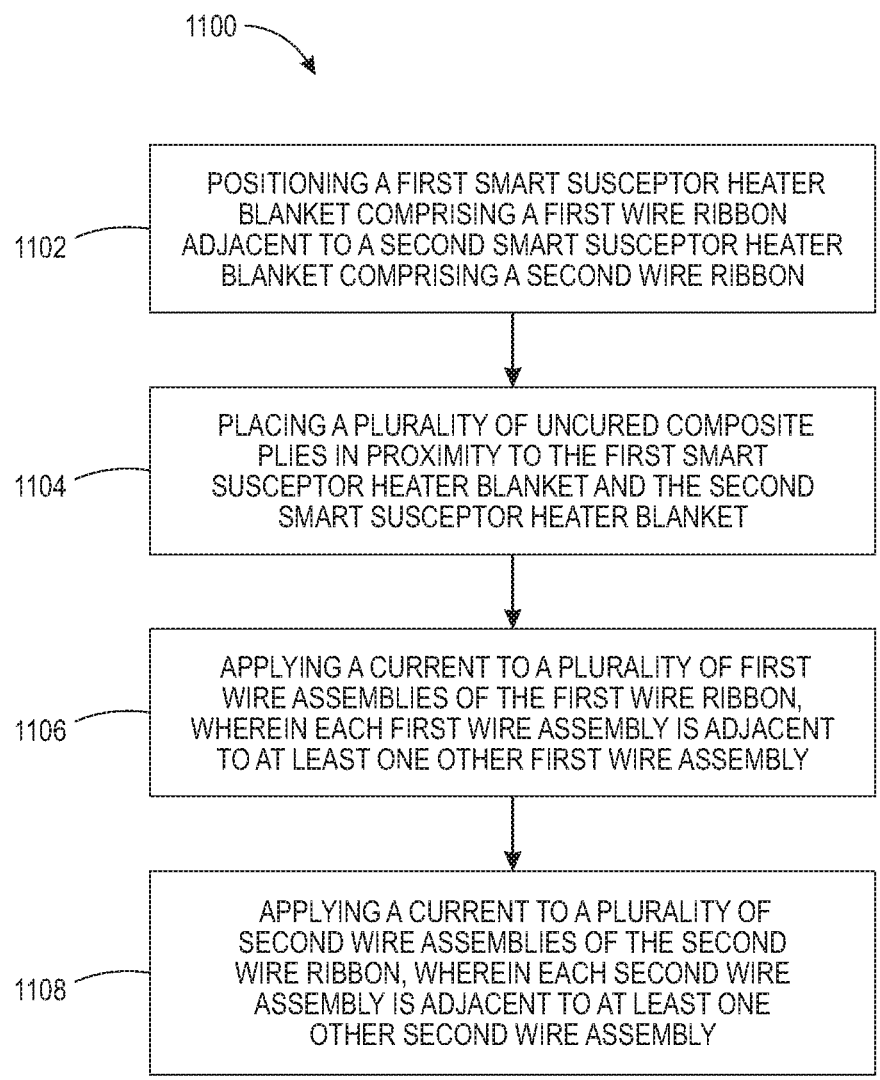
FIG. 11 is a flow chart of a method according to an embodiment of the present teachings.

FIG. 11 is a flow chart depicting a method 1100 for processing an article through the application of heat. The method can include positioning a first smart susceptor heater blanket having a first wire ribbon adjacent to a second smart susceptor heater blanket including a second wire ribbon as depicted at 1102. Next, a plurality of uncured composite plies may be placed in proximity to the first smart susceptor heater blanket and the second smart susceptor heater blanket as depicted at 1104. A current may be applied to a plurality of first wire assemblies of the first wire ribbon as depicted at 1106. In an embodiment, each first wire assembly may be adjacent to at least one other first wire assembly such that a current flow through each first wire assembly is in a direction that is opposite to a current flow through any adjacent first wire assembly. Additionally, a current may be applied to a plurality of second wire assemblies of the second wire ribbon such that a current flow through each second wire assembly is in a direction that is opposite to a current flow through any adjacent second wire assembly as depicted at 1108. In an embodiment of the FIG. 11 method, each second wire assembly may be adjacent to at least one other second wire assembly. Further, the positioning may further include placing the first smart susceptor heater blanket adjacent to one of the second wire assemblies such that the current flow through the first wire assembly adjacent to the second wire assembly is in an direction that is opposite to the current flow through the adjacent second wire assembly.

It will be appreciated that, one or more of the acts depicted herein, for example, in FIG. 11, may be carried out in one or more separate acts and/or phases, and/or in a different order than that depicted.

The apparatus described herein may be used for debulking of a composite part or for other processing operations. For example, FIG. 12 depicts an aircraft 1200 that includes composite parts that may be debulked or otherwise processed using an embodiment of the present teachings. In one particular used, a horizontal stabilizer 1202, a vertical stabilizer 1204, and/or other aircraft structures may be processed as described above.

The design of the individual smart susceptor heater blankets thus enables the ability to place the heater blankets directly adjacent to one another without causing electromagnetic or thermal interference between heater blankets. Within each wire ribbon, and in the outermost conductors of adjacent wire ribbons, the currents in any two adjacent conductors will, in general, always travel in opposing directions. This ensures that any magnetic field not absorbed by the susceptor windings is minimized by cancellation of an opposing field generated by the two adjacent wires. Other embodiments are contemplated, for example, where the conductors at blanket edges are powered by different power supplies. In general, the heater blankets are relatively large and contain many conductors and so any interference between the outermost conductors on adjacent blankets will be manageably small.

The use of several interconnected heater blankets further allows for debulking or other processing of larger workpieces outside of an autoclave than was previously practical using a single large heater blanket. Damage to a large heater blanket results in the replacement of the entire heater blanket. If damage occurs to one of the heater blankets of the assembly described herein, the modular design using a plurality of heater blankets results in the replacement of only one of the subunits. Further, the high current and voltage needed to drive a plurality of litz wires within single large blanket is expensive and hazardous to manufacturing personnel. Powering multiple heater blankets using multiple power supplies allows for use of lower current and voltages, which improve safety for manufacturing personnel.

It will be appreciated that the structures described herein as a vacuum bag may be, in some embodiments, a vacuum bag such as a disposable vacuum bag or single-use vacuum bag that provides a vacuum chamber into which the workpiece is inserted and then sealed within during a debulking process (see, for example, the vacuum bag 1106 of FIG. 10). In other embodiments, a vacuum bag may be a vacuum membrane such as a single sheet, or two or more laminated sheets, of pliable material that, together with another structure such as the layup mandrel, form an enclosed and sealed vacuum chamber that is used to provide a vacuum around the workpiece.

Notwithstanding that the numerical ranges and parameters setting forth the broad scope of the present teachings are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 5. In certain cases, the numerical values as stated for the parameter can take on negative values. In this case, the example value of range stated as "less than 10" can assume negative values, e.g. −1, −2, −3, −10, −20, −30, etc.

While the present teachings have been illustrated with respect to one or more implementations, alterations and/or modifications can be made to the illustrated examples without departing from the spirit and scope of the appended claims. For example, it will be appreciated that while the process is described as a series of acts or events, the present teachings are not limited by the ordering of such acts or events. Some acts may occur in different orders and/or concurrently with other acts or events apart from those described herein. Also, not all process stages may be required to implement a methodology in accordance with one or more aspects or embodiments of the present teachings. It will be appreciated that structural components and/or processing stages can be added or existing structural components and/or processing stages can be removed or modified. Further, one or more of the acts depicted herein may be carried out in one or more separate acts and/or phases. Furthermore, to the extent that the terms "including," "includes," "having," "has," "with," or variants thereof are used in either the detailed description and the claims, such terms are intended to be inclusive in a manner similar to the term "comprising." The term "at least one of" is used to mean one or more of the listed items can be selected. As used herein, the term "one or more of" with respect to a listing of items such as, for example, A and B, means A alone, B alone, or A and B. The term "at least one of" is used to mean one or more of the listed items can be selected. Further, in the discussion and claims herein, the term "on" used with respect to two materials, one "on" the other, means at least some contact between the materials, while "over" means the materials are in proximity, but possibly with one or more additional intervening materials such that contact is possible but not required. Neither "on" nor "over" implies any directionality as used herein. The term "conformal" describes a coating material in which angles of the underlying material are preserved by the conformal material. The term "about" indicates that the value listed may be somewhat altered, as long as the alteration does not result in nonconformance of the process or structure to the illustrated embodiment. Finally, "exemplary" indicates the description is used as an example, rather than implying that it is an ideal. Other embodiments of the present teachings will be apparent to those skilled in the art from consideration of the specification and practice of the disclosure herein. It is intended that the specification and examples be considered as exemplary only, with a true scope and spirit of the present teachings being indicated by the following claims.

Terms of relative position as used in this application are defined based on a plane parallel to the conventional plane or working surface of a workpiece, regardless of the orientation of the workpiece. The term "horizontal" or "lateral" as used in this application is defined as a plane parallel to the conventional plane or working surface of a workpiece, regardless of the orientation of the workpiece. The term "vertical" refers to a direction perpendicular to the horizontal. Terms such as "on," "side" (as in "sidewall"), "higher," "lower," "over," "top," and "under" are defined with respect to the conventional plane or working surface being on the top surface of the workpiece, regardless of the orientation of the workpiece.

The invention claimed is:

1. An apparatus for processing an article through application of heat, comprising:
 a first smart susceptor heater blanket comprising a first wire ribbon, wherein:
  the first wire ribbon comprises a plurality of first wire assemblies;
  each first wire assembly is adjacent to at least one other first wire assembly;
  each first wire assembly comprises a litz wire and a susceptor wire wrapped around the litz wire to form a plurality of susceptor windings;
  the first wire ribbon serpentines across the first smart susceptor heater blanket; and
  the first wire ribbon is configured such that a current flow through each first wire assembly is in a direction opposite to a current flow through one or more adjacent first wire assemblies; and
 a second smart susceptor heater blanket comprising a second wire ribbon, wherein:
  the second wire ribbon comprises a plurality of second wire assemblies;
  each second wire assembly is adjacent to at least one other second wire assembly;
  each second wire assembly comprises a litz wire and a susceptor wire wrapped around the litz wire to form a plurality of susceptor windings;
  the second wire ribbon serpentines across the second smart susceptor heater blanket; and
  the second wire ribbon is configured such that a current flow through each second wire assembly is in a direction opposite to a current flow through one or more adjacent second wire assemblies, wherein one of the first wire assemblies of the first wire ribbon is positioned adjacent to one of the second wire assemblies of the second wire ribbon and is configured such that a flow of current therethrough is in direction that is opposite to a flow of current through the second wire assembly positioned adjacent thereto.

2. The apparatus of claim 1, wherein the first smart susceptor heater blanket is electrically coupled in series to the second smart susceptor heater blanket.

3. The apparatus of claim 1, wherein the first smart susceptor heater blanket is electrically coupled in parallel to the second smart susceptor heater blanket.

4. The apparatus of claim 3, further comprising:
a first power supply electrically coupled to the first wire ribbon of the first smart susceptor heater blanket; and
a second power supply electrically coupled to the second wire ribbon of the second smart susceptor heater blanket.

5. The apparatus of claim 4, further comprising a controller electrically coupled to the first power supply and to the second power supply, wherein the controller is configured to regulate a power output by the first power supply to the first wire ribbon, and is further configured to regulate a power output by the second power supply to the second wire ribbon.

6. The apparatus of claim 5, further comprising:
a first plurality of thermal sensors distributed across the first smart susceptor heater blanket, wherein the controller is configured to regulate the power output by the first power supply to the first wire ribbon based on an output received from the first plurality of thermal sensors; and
a second plurality of thermal sensors distributed across the second smart susceptor heater blanket, wherein the controller is further configured to regulate the power output by the second power supply to the second wire ribbon based on an output received from the second plurality of thermal sensors.

7. The apparatus of claim 1, further comprising:
a first slave controller electrically coupled to the first smart susceptor heater blanket;
a first plurality of thermal sensors distributed across the first smart susceptor heater blanket;
a first power supply electrically coupled to the first slave controller and to the first smart susceptor heater blanket, wherein the first slave controller is configured to regulate a power output by the first power supply to the first smart susceptor heater blanket based on an output received from the first plurality of thermal sensors;
a second slave controller electrically coupled to the second smart susceptor heater blanket;
a second plurality of thermal sensors distributed across the second smart susceptor heater blanket;
a second power supply electrically coupled to the second slave controller and to the second smart susceptor heater blanket, wherein the second slave controller is configured to regulate a power output by the second power supply to the second smart susceptor heater blanket based on an output received from the second plurality of thermal sensors; and
a master controller electrically coupled to the first slave controller and to the second slave controller, wherein the master controller is configured to receive the output from the first plurality of thermal sensors and the output from the second plurality of thermal sensors, and is further configured to regulate the power output by the first power supply to the first smart susceptor heater blanket based on the output received from the second plurality of thermal sensors, and is further configured to regulate the power output by the second power supply to the second smart susceptor heater blanket based on the output received from the first plurality of thermal sensors.

8. The apparatus of claim 1, wherein:
the first wire ribbon has a first length that is within ±10% of a target length; and
the second wire has a second length that is within ±10% of the target length.

9. The apparatus of claim 1, further comprising a vacuum bag positioned adjacent to the first smart susceptor heater blanket and the second smart susceptor heater blanket, wherein the vacuum bag is configured to receive a plurality of composite plies pre-impregnated with an uncured resin during a debulking process.

10. The apparatus of claim 9, further comprising a plurality of fasteners that mechanically attach the first smart susceptor heater blanket and the second smart susceptor heater blanket to the vacuum bag, and maintain the first smart susceptor heater blanket in a fixed position adjacent to the second smart susceptor heater blanket.

11. An apparatus for processing an article through application of heat, comprising:
a first heater blanket comprising a first wire ribbon, the first wire ribbon comprising a plurality of first wire assemblies where each first wire assembly is adjacent to at least one other first wire assembly and each first wire assembly comprises a litz wire and a susceptor wire wrapped around the litz wire to form a plurality of susceptor windings, wherein the first wire ribbon is configured such that a current flow through each first wire assembly is in a direction opposite to a current flow through each adjacent first wire assembly of the first wire ribbon;
a second heater blanket comprising a second wire ribbon, the second wire ribbon comprising a plurality of second wire assemblies where each second wire assembly is adjacent to at least one other second wire assembly and each second wire assembly comprises a litz wire and a susceptor wire wrapped around the litz wire to form a plurality of susceptor windings, wherein the second wire ribbon is configured such that a current flow through each second wire assembly is in a direction opposite to a current flow through each adjacent second wire assembly of the second wire ribbon; and
one of the first wire assemblies of the first wire ribbon is positioned adjacent to one of the second wire assemblies of the second wire ribbon and is configured such that a flow of current therethrough is in direction that is opposite to a flow of current through the second wire assembly positioned adjacent thereto.

12. The apparatus of claim 11, wherein the first heater blanket is electrically coupled in series to the second heater blanket.

13. The apparatus of claim 11, wherein the first heater blanket is electrically coupled in parallel to the second heater blanket.

14. The apparatus of claim 13, further comprising:
a first power supply electrically coupled to the first wire ribbon of the first heater blanket; and
a second power supply electrically coupled to the second wire ribbon of the second heater blanket.

15. The apparatus of claim 14, further comprising a controller electrically coupled to the first power supply and to the second power supply, wherein the controller is configured to regulate a power output by the first power supply to the first wire ribbon, and is further configured to regulate a power output by the second power supply to the second wire ribbon.

16. The apparatus of claim 15, further comprising:
   a first plurality of thermal sensors distributed across the first heater blanket, wherein the controller is configured to regulate the power output by the first power supply to the first wire ribbon based on an output received from the first plurality of thermal sensors; and
   a second plurality of thermal sensors distributed across the second heater blanket, wherein the controller is further configured to regulate the power output by the second power supply to the second wire ribbon based on an output received from the second plurality of thermal sensors.

17. The apparatus of claim 11, further comprising:
   a first slave controller electrically coupled to the first heater blanket;
   a first plurality of thermal sensors distributed across the first heater blanket;
   a first power supply electrically coupled to the first slave controller and to the first heater blanket, wherein the first slave controller is configured to regulate a power output by the first power supply to the first heater blanket based on an output received from the first plurality of thermal sensors;
   a second slave controller electrically coupled to the second heater blanket;
   a second plurality of thermal sensors distributed across the second heater blanket;
   a second power supply electrically coupled to the second slave controller and to the second heater blanket, wherein the second slave controller is configured to regulate a power output by the second power supply to the second heater blanket based on an output received from the second plurality of thermal sensors; and
   a master controller electrically coupled to the first slave controller and to the second slave controller, wherein the master controller is configured to receive the output from the first plurality of thermal sensors and the output from the second plurality of thermal sensors, and is further configured to regulate the power output by the first power supply to the first heater blanket based on the output received from the second plurality of thermal sensors, and is further configured to regulate the power output by the second power supply to the second heater blanket based on the output received from the first plurality of thermal sensors.

18. The apparatus of claim 11, wherein:
   the first wire ribbon has a first length that is within ±10% of a target length; and
   the second wire has a second length that is within ±10% of the target length.

19. The apparatus of claim 11, further comprising a vacuum bag positioned adjacent to the first heater blanket and the second heater blanket, wherein the vacuum bag is configured to receive a plurality of composite plies pre-impregnated with an uncured resin during a debulking process.

20. The apparatus of claim 19, further comprising a plurality of fasteners that mechanically attach the first heater blanket and the second heater blanket to the vacuum bag, and maintain the first heater blanket in a fixed position adjacent to the second heater blanket.

* * * * *